United States Patent
Zoescher (10) Patent No.: US 9,716,443 B2
(45) Date of Patent: Jul. 25, 2017

(54) VOLTAGE CONVERTER

(71) Applicant: NXP B.V., Eindhoven (NL)

(72) Inventor: Lukas Zoescher, Graz (AT)

(73) Assignee: NXP B.V., Eindhoven (NL)

( * ) Notice: Subject to any disclaimer, the term of this patent is extended or adjusted under 35 U.S.C. 154(b) by 202 days.

(21) Appl. No.: 14/791,230

(22) Filed: Jul. 2, 2015

(65) Prior Publication Data

US 2016/0006369 A1 Jan. 7, 2016

(30) Foreign Application Priority Data

Jul. 4, 2014 (EP) ..................................... 14175820

(51) Int. Cl.
*H02M 7/537* (2006.01)
*H04B 1/40* (2015.01)
*G06K 19/07* (2006.01)
*H02M 7/217* (2006.01)

(52) U.S. Cl.
CPC ........ *H02M 7/537* (2013.01); *G06K 19/0701* (2013.01); *H02M 7/217* (2013.01); *H04B 1/40* (2013.01)

(58) Field of Classification Search
USPC .............. 455/41.1, 41.2, 41.3, 73; 340/10.1, 340/10.42, 13.24, 13.25, 13.26; 363/15, 363/34, 37, 67, 70, 81, 84, 89, 125, 127; 327/309, 318–321
See application file for complete search history.

(56) References Cited

U.S. PATENT DOCUMENTS

| | | | |
|---|---|---|---|
| 5,045,770 A | 9/1991 | Brooks | |
| 5,252,911 A * | 10/1993 | Banura | H02M 3/158 323/266 |
| 5,815,355 A | 9/1998 | Dawes | |
| 5,874,829 A | 2/1999 | Holweg et al. | |
| 6,134,130 A | 10/2000 | Connell et al. | |
| 6,657,872 B2 * | 12/2003 | Chapuis | H02M 3/33592 363/127 |

(Continued)

FOREIGN PATENT DOCUMENTS

EP 1 821 405 A1 8/2007

OTHER PUBLICATIONS

Balachandran, G. K. et al. "A Passive UHF RFID Demodulator With RF Overvoltage Protection and Automatic Weighted Threshold Adjustment", IEEE Transactions on Circuits and Systems-I, vol. 57, No. 9, pp. 2291-2300 (Sep. 2010).

(Continued)

*Primary Examiner* — Nay A Maung
*Assistant Examiner* — Erica Fleming-Hall (57) ABSTRACT

A radio frequency transponder circuit, comprising: an AC-DC converter (70) connected to an RF input terminal (21a) and a DC output terminal (81) and operable to convert an RF signal ($RF_A$) at the RF input terminal (21a) to a DC output signal ($V_{DD}$) at the DC output terminal (81); and a voltage limiting circuit (50) connected to the RF input terminal (21a) and operable to limit the amplitude of the RF signal ($RF_A$); wherein the voltage limiting circuit (50) comprises a NMOS limiting transistor (51) in parallel with a complimentary PMOS limiting transistor (52).

15 Claims, 6 Drawing Sheets

(56) References Cited

U.S. PATENT DOCUMENTS

| | | | |
|---|---|---|---|
| 7,703,677 B2 | 4/2010 | Alihodzic | |
| 7,710,213 B2 | 5/2010 | Berhorst et al. | |
| 7,929,265 B2 | 4/2011 | Brandl et al. | |
| 7,990,249 B1 | 8/2011 | Hyde et al. | |
| 8,314,685 B2 | 11/2012 | Balachandran et al. | |
| 9,001,529 B2* | 4/2015 | Muratov | H02M 3/24 323/299 |
| 2006/0198197 A1* | 9/2006 | Ku | H03K 17/08128 365/185.21 |
| 2007/0069291 A1* | 3/2007 | Stuber | H01L 27/1203 257/347 |
| 2007/0075147 A1 | 4/2007 | Ng | |
| 2007/0087719 A1* | 4/2007 | Mandal | H01Q 1/22 455/299 |
| 2008/0180224 A1 | 7/2008 | Klapf et al. | |
| 2009/0322312 A1* | 12/2009 | Arnborg | G01R 21/01 324/120 |
| 2011/0116794 A1* | 5/2011 | George | H04B 10/25754 398/45 |
| 2012/0313709 A1* | 12/2012 | Lautzenhiser | H03F 1/301 330/285 |
| 2013/0043735 A1* | 2/2013 | Low | H04B 5/0012 307/104 |
| 2013/0062959 A1* | 3/2013 | Lee | H04B 5/0031 307/104 |
| 2013/0155742 A1* | 6/2013 | Lee | H02M 7/103 363/126 |
| 2014/0333382 A1* | 11/2014 | Lautzenhiser | H03G 3/3036 330/285 |
| 2016/0006369 A1* | 1/2016 | Zoescher | H02M 7/217 455/73 |

OTHER PUBLICATIONS

Missoni, A. et al. "A Triple-Band Passive RFID Tag", IEEE International Solid-State Circuits Conference, pp. 288-289, 614 (Feb. 2008).

Extended European Search Report for Patent Appln. No. 14175820.1 (Jan. 21, 2015).

Facen, A. et al. "A CMOS Analog Frontend for a Passive UHF RFID Tag", IEEE Proceedings of the 2006 International Symposium on Low Power Electronics and Design, pp. 280-285 (Oct. 2006).

\* cited by examiner

VOLTAGE CONVERTER

CROSS-REFERENCE TO RELATED APPLICATIONS

This application claims the priority under 35 U.S.C. §119 of European patent application no. 14175820.1, filed on Jul. 4, 2014, the contents of which are incorporated by reference herein.

FIELD

The invention relates to a voltage converter, for instance for use in a radio transponder.

BACKGROUND

Radio frequency transponders (often referred to as RFID transponders or tags) may be classified in a number of ways including: operating frequency, the coupling mechanism with the antenna, and how the transponder is powered. In some types of transponder an auxiliary power supply may be present, and in others power may be solely derived from an impinging electro-magnetic field. Transponders may be classified as passive, semi-passive or active, depending on how they are powered. Passive transponders draw their operating power completely from the impinging magnetic or electro-magnetic field. In case of semi-passive transponders the core of the transponder is supplied with power by external means (not dependent on the impinging magnetic or electro-magnetic field), and the energy for communication between transponder and a fixed reader station or interrogator is carried by the impinging field. Active transponders utilize energy from an external supply for communicating with the interrogator.

Referring to the operating frequency, low frequency (LF), high frequency (HF) and ultra-high frequency (UHF) transponders may be distinguished. Communication and power supply of LF tags (which may operate predominantly at 125 kHz or 134 kHz) and HF transponders (typically centred at 13.56 MHz) are normally based on direct magnetic coupling between a coil of a reader device and the transponder. UHF transponders (which may use carrier frequencies around 900 MHz or 2.4 GHz) typically extract the supply power from the radiated field of a reader and communicate by modulating the effective radar cross-section of the transponder. In contrast to LF and HF transponders, which are matched by using a simple parallel resonance circuit to a coil, UHF transponders typically possess a true resonant antenna. In most cases the antenna is a dipole structure, which is directly matched to the input impedance of the transponder integrated circuit (IC). In both cases (LF/HF and UHF) the impinging field and therefore the available power may vary significantly. In consequence, a voltage regulator is required to stabilize the internal supply voltage at a specific level. A shunt voltage regulator is typically used, which shunts excess voltage and dissipates the excess energy.

For communicating with the reader, LF and HF transponders employ load modulation, which means the devices change the quality factor of a resonant coil circuit, modulating the quality factor in correspondence with the data stream. To achieve a detectable amplitude of back-modulation at low field strength, the quality factor and therewith the input voltage amplitude at a given DC load of the transponder IC must not fall below a certain threshold. A maximum tolerable voltage may be determined by the IC technology used in the transponder. The window between the minimum voltage amplitude and the maximum tolerable voltage amplitude may be relatively narrow (e.g.: approximately 2.5 V to 3.6 V). The voltage regulator therefore is a critical component with respect to the overall performance of LF and HF frontends. A large number of different circuit topologies for shunt regulators are known (see for instance U.S. Pat. No. 5,045,770, U.S. Pat. No. 5,874,829, U.S. Pat. No. 613,413, U.S. Pat. No. 7,703,677, U.S. Pat. No. 7,929,265 and US 2008/0180224).

Figure 1:
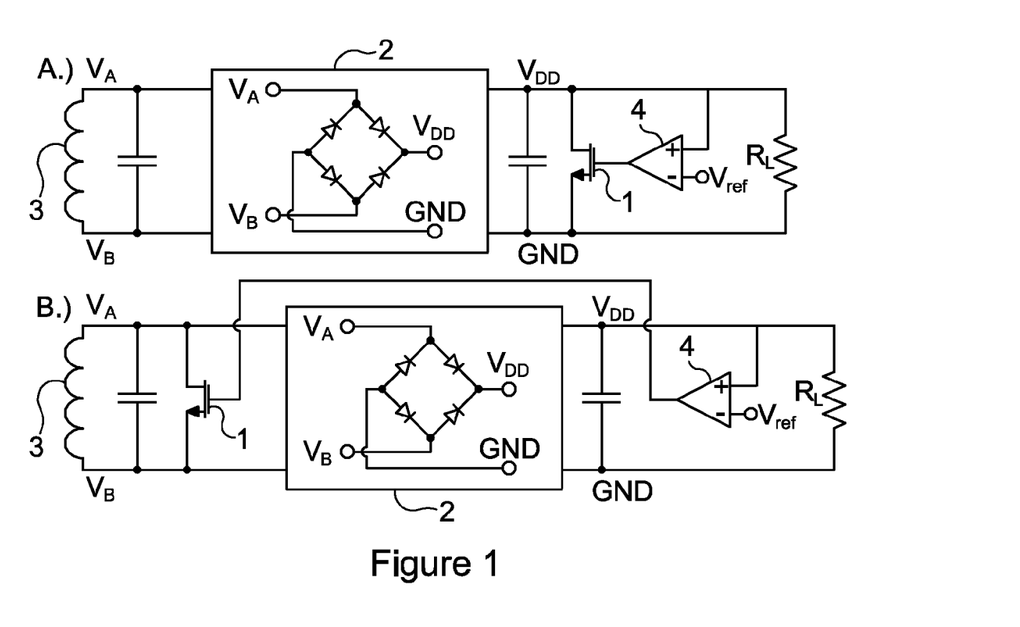
FIG. 1 is a circuit diagram of two LF/HF frontends in which a voltage limiting circuit is provided: A) at the DC side of a rectifier; and B) at the RF side of the rectifier.

In principle, two forms of implementations of shunt regulator for LF and HF applications can be distinguished in the prior art, as shown in simplified form in FIG. 1, denoted by A and B. In both circuits there is a coil 3, connected to an AC side of a rectifier 2. A load resistor $R_L$ represents the circuit supplied by the DC side of the rectifier 2. In both cases an active load transistor 1 is used in a control loop to directly regulate a DC output of the rectifier 2. In case A the transistor 1 is placed at the DC side of the rectifier 2 and in case B, directly at the AC input of the rectifier 2. As indicated in FIG. 1, the active load device in CMOS implementations is typically an N-type transistor 1 (NMOST). In these examples, a differential amplifier 4 provides a positive bias signal to the NMOST 1 when the DC output voltage $V_{DD}$ from the rectifier 2 exceeds a reference voltage $V_{ref}$.

The rectifier structure found in most implementations, unlike that indicated in FIG. 1, may be a hybrid type using a cross-coupled pair of transistors as pass devices with regard to chip ground. In consequence the negative swing relative to ground may be small in relation to the overall input amplitude.

The pass devices of the rectifier 2 with respect to the positive supply $V_{DD}$ could be ordinary PN diodes or Schottky diodes, but in most cases are MOS transistors in diode configuration, hence with shorted gate-drain nodes. Referring to circuit A in FIG. 1 it can be seen that the complete excess current is passed though the rectifier 2. Although relatively high RMS currents may occur at maximum field strength (for instance 40 mA at a field strength of 7.5 A/m) the difference between regulated DC voltage level and AC amplitude at the coil caused by the voltage drop at the rectifying devices does usually not exceed 1 V due to the non-linear characteristic of the pass devices of the rectifier 2. In circuit version B the voltage drop is even smaller, as the excess current is shunted directly at the coil terminal (before it reaches the rectifier 2).

Figure 2:
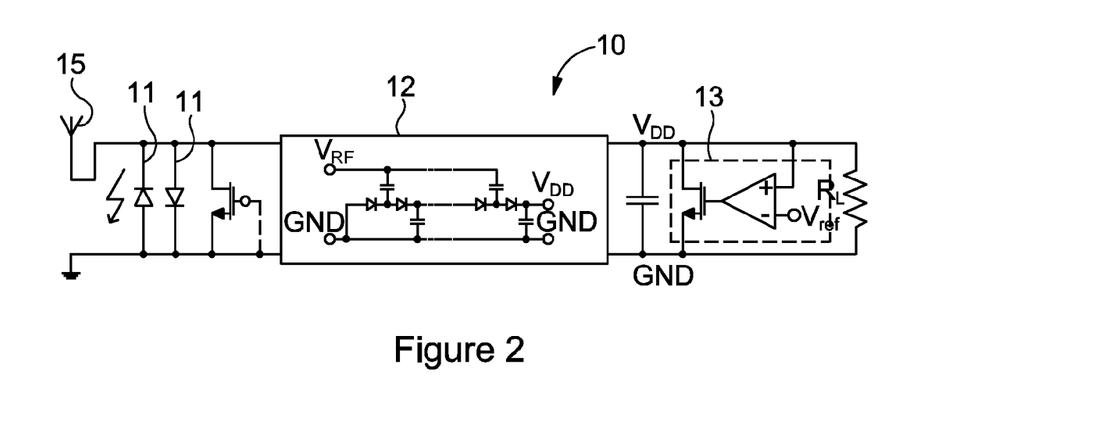
FIG. 2 is a circuit diagram of a UHF front end.

In the case of UHF transponders, in contrast to LF and HF transponders, a low quality (Q) factor at minimum DC load is desirable to allow a broadband impedance matching of antenna and IC. In general, a Q factor in the range of 15 may be appropriate, corresponding to a bandwidth of larger than 150 MHz at UHF frequencies. At a typical effective load current of about 5 µA for a read operation at a DC supply of 1 V and an equivalent parallel input capacitance between 500 fF and 1 pF, the associated minimum input RF amplitude at the frontend to achieve this Q factor may typically be below 300 mV. The power conversion between the required low input RF amplitude and the DC supply in the range of 1 V is typically accomplished by a charge-pump circuit with multiple stages. A simplified circuit diagram of a known single ended UHF power conversion unit (PCU) 10 including antenna 15, electro static discharge (ESD) structures 11, Dickson charge-pump 12 and shunt regulator 13 is shown in FIG. 2. Additionally the modulating transistor 14 for modulating the antenna response is shown, which may, in an alternative arrangement, be integrated into the ESD protection structures 11.

Differential frontends typically may use Dickson like circuits, or may use cross-coupled bridge type charge-pumps. In a differential frontend, the ESD structures 11 and modulating transistor 14 as depicted in FIG. 2 are typically connected in a differential implementation in mirrored form with respect to the chip ground.

Unlike in the case of the rectifiers used for LF and HF devices the pass devices of the charge-pumps in UHF transponders are not directly connected to the input RF node, but instead need to be coupled capacitively (i.e. via a capacitor) thereto. In UHF devices, DC side voltage regulators are predominantly employed, and the shunted excess current is limited in consequence by the size of the coupling capacitors for a given input power. The input voltage amplitude therefore rises significantly with increasing input power.

As the amplitude reaches a certain limit, the anti-parallel ESD diodes 11 and ground-connected MOS-transistors found at the RF side of the charge pump 12 start to dissipate additional excess power. Ground connected transistors may be associated with the modulator circuitry 14, and may also be present in the ESD protection circuit. In CMOS implementations, such transistors are typically NMOS transistors. Despite the strong non-linear characteristic of these devices, the voltage amplitude observed at a maximum operating input power of 20 dBm may still reach 1 V.

State of the art UHF RFID ICs are based on CMOS technologies featuring minimum channel lengths of around 140 nm. Typical maximum operating voltages of such MOS devices lie in the range of 1.8 V. With progressing technology and decreasing minimum feature size, maximum voltage ratings decrease. For example, for 90 nm and 40 nm technologies operating voltage limits of around 1.3 V and 1.2 V have to be considered. In single-ended frontends, although such reduced limits may still lie above the estimated clamping voltage of 1 V provided by anti-parallel ESD diodes, the margin is substantially decreased. For differential frontends, due to the series connection of two diodes between the symmetrical RF nodes, the clamping voltage is approximately doubled and the voltage limits might be exceeded. In order to maintain the desired specifications on maximum operating power the voltage-limiting structures associated with differential PCUs have to be changed when moving to advanced technologies.

Furthermore, the hard clamping behaviour of the ESD diodes 11 is disadvantageous, because it results in the generation of higher order harmonics. These may result in harmonic modulation of the effective area of the antenna 15, which is undesirable. This problem applies to both differential and single-ended frontends.

A known solution to enhance the voltage limiting arrangement of FIG. 2 is to use a NMOS active load connected directly at the RF terminal with a positive control voltage, as already described in conjunction with HF frontends.

Figure 3:
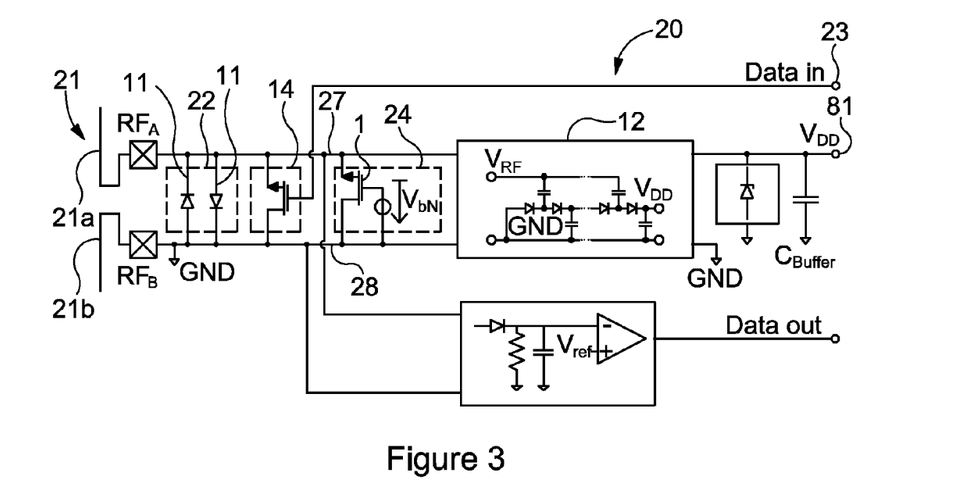
FIG. 3 is a circuit diagram of a UHF front end with an NMOS RF voltage limiting transistor.

FIG. 3 shows a UHF transponder frontend 20, comprising a UHF antenna 21. In the single ended arrangement of FIG. 3, one terminal 21*b* of the antenna 21 is grounded. The signal from the non-grounded antenna terminal 21*a* provides the RF input $RF_A$ to an RF input rail 27 of the frontend 20. An ESD protection circuit 22 is included, comprising a pair of anti-parallel ESD protection diodes 11 connected between a ground rail 28 and the RF input rail 27. A modulating transistor 14 is connected between the RF input rail 27 and ground 28. The gate of the modulating transistor 14 is connected to a data input terminal 23, so that the characteristics of the antenna 21 are modulated in accordance with the data signal 23. A voltage limiter 24 comprising an NMOS limiting transistor 1 is connected between the RF rail 27 and the ground rail 28.

A positive bias voltage $V_{bN}$ is provided for the NMOS limiting transistor 1. The positive bias voltage $V_{bN}$ controls the source-drain current through the limiting transistor 1. In some arrangements the active-load device might be incorporated in the ESD circuit 22.

Figure 4:
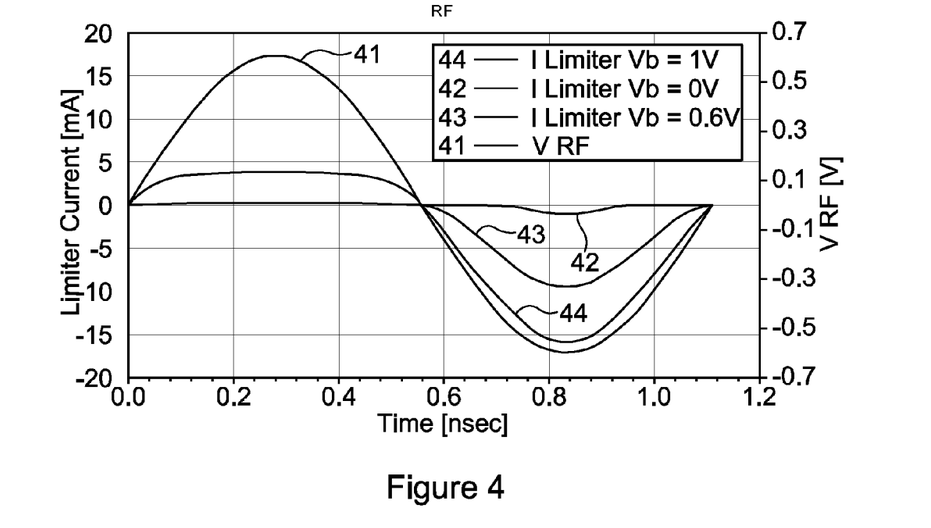
FIG. 4 is a graph of source drain current through the NMOS limiting transistor of FIG. 3, compared with the RF input voltage waveform.

The arrangement incorporates however a major disadvantage, which can be identified considering the transient voltage and current characteristics shown in FIG. 4, which shows a plot of the RF input voltage 41 with respect to time compared to the source drain current through the limiting transistor 1. Source drain currents for bias voltages of 0 V, 0.6 V and 1 V are shown in curves 42, 43 and 44 respectively.

During the positive half wave of the RF input voltage 41 the potential between gate and ground node of the limiting transistor 1 corresponds to the gate source voltage of the limiting transistor 1. This voltage can be assumed to be fixed during one period. In consequence the limiting transistor 1 is either non-conductive at all or is driven increasingly towards a saturation region of operation with rising amplitude. During the negative half wave the potential difference between the RF node and the gate determines the effective gate source voltage. As the negative input voltage swing increases the limiting transistor 1 gets progressively more conductive causing the strongly asymmetrical current waveforms 44, 43 and 42 shown in FIG. 3. It is notable that this behaviour may also be observed if no limiting transistor is present. In this case during the negative half-wave any virtually ground-connected NMOS devices present in the modulator 14 (for example) provide the primary shunt path. Considering only the individual RF nodes with reference to ground, the NMOS dominated structure does not behave symmetrically. This imbalance has the inevitable effect that at higher voltage amplitudes the DC potential at the RF input node rises with respect to chip ground. The ground connected NMOS structures behave as a parasitic charge-pump.

FIG. 4 simplifies the RF voltage waveform 41 as an ideal sine wave, which does not realistically reflect the behaviour at an UHF frontend since the antenna impedance is neglected. Nevertheless, the observed asymmetrical current flow characteristic through the NMOS limiting transistor is a real effect that occurs in operation. Voltage and current transients at the RF port are directly related to back-scattered signals from the antenna, so the asymmetrical behaviour as indicated by FIG. 4 may cause significant harmonic radiation from the antenna 15 at higher input power levels. It also should be noted that UHF RFID transponders are subject to frequency regulation like standard RF devices, and such radiated harmonics may be particularly undesirable in this respect.

It is an object of the invention to overcome or ameliorate at least some of the above mentioned problems.

SUMMARY

According to a first aspect of the invention there is provided a voltage converter, comprising:

an AC-DC converter connected to an RF input terminal and a DC output terminal and operable to convert an RF signal at the RF input terminal to a DC output signal at the DC output terminal; and a voltage limiting circuit connected to the RF input terminal and operable to limit the amplitude of the RF signal:

wherein the voltage limiting circuit comprises a NMOS limiting transistor in parallel with a complimentary PMOS limiting transistor.

The use of a complementary NMOS and PMOS in the voltage limiting circuit enables a symmetric response to positive and negative voltage swings of the RF signal.

The voltage limiting circuit may further comprise a biasing means operable to generate a positive and negative bias voltage for controlling the operation of the NMOS and PMOS limiting transistors respectively.

The biasing means may be configured to provide symmetric bias potentials to the NMOS and PMOS limiting transistors.

The biasing means may comprise a charge pump. The charge pump may be arranged to generate a bias potential for a limiting transistor.

A charge pump may be arranged to generate a negative bias potential from the RF signal. The charge pump may provide the negative bias potential to the PMOS limiting transistor.

The biasing means may comprise a first charge pump and a second charge pump, wherein the first charge pump is arranged to generate a negative bias signal from the RF signal, and the second charge pump is arranged to generate a positive bias signal from the RF signal.

At least one charge pump of the biasing means may be configured with a minimum input voltage amplitude below which the charge pump is inoperable.

The minimum input voltage amplitude for operating the charge pump may be greater than 0.3 V. The minimum input voltage amplitude for operating the charge pump may be greater than 0.1V, 0.2 V, or 0.4V.

The biasing means may comprise a resistive load connected to a gate of each limiting transistor.

The biasing means may comprise a transistor connected to the gate of each limiting transistor.

The voltage limiting circuit may be connected between the RF input terminal and ground.

The AC-DC converter may be configured for connection to a differential RF input comprising a first and second RF input terminal, such that the voltage limiting circuit is arranged between the first and second RF terminals.

The voltage limiting circuit may have a substantially symmetric response to positive and negative over voltage of the RF signal.

The circuit may be for a UHF transponder.

According to a second aspect of the invention, there is provided a radio frequency transponder comprising: an antenna, the voltage converter of the first aspect of the invention, a demodulator for receiving data from the antenna and a modulator for transmitting data via the antenna, wherein the voltage limiting circuit is arranged to regulate the amplitude of an RF signal from the antenna.

BRIEF DESCRIPTION OF DRAWINGS

Example embodiments will now be described, with reference to the accompanying drawings, in which.

DETAILED DESCRIPTION

Figure 5:
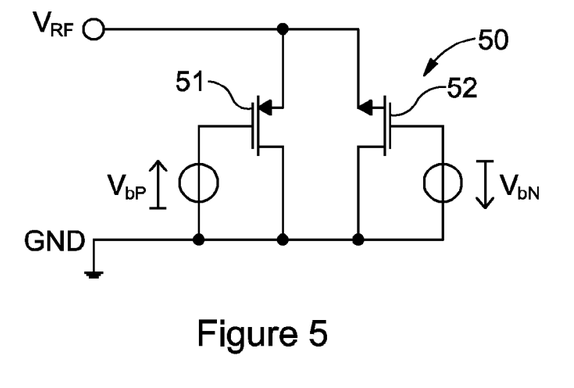
FIG. 5 circuit diagram of an exemplary voltage limiting circuit.

Referring to FIG. 5, a voltage limiting circuit 50 is shown, comprising an NMOS limiting transistor 52 and a PMOS limiting transistor 51. The NMOS and PMOS limiting transistors 52, 51 are connected in parallel between the RF signal $V_{RF}$ and ground GND, so that they can shunt excess RF signal voltage to ground. A negative bias voltage source $V_{bP}$ is connected to the gate of the PMOS limiting transistor 51, and a positive bias voltage source $V_{bN}$ is connected to the gate of the NMOS limiting transistor 52.

Figure 6:
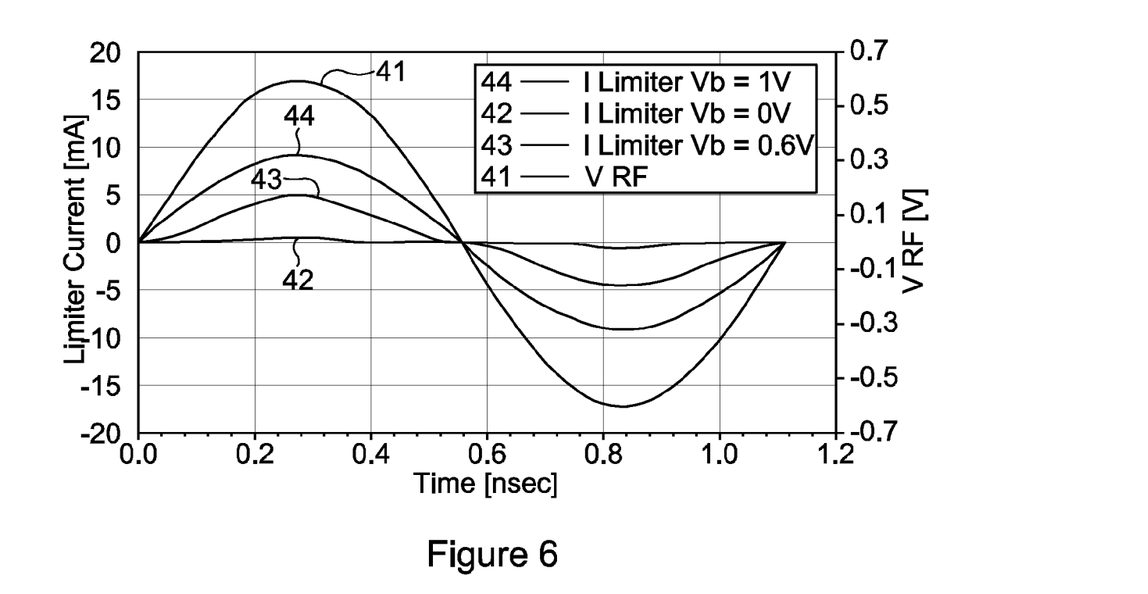
FIG. 6 is a graph of source drain current through the voltage limiting circuit of FIG. 5, compared with the RF input voltage waveform.

The bias voltage sources that generate $V_{bN}$ and $V_{bP}$ may be configured to provide symmetric bias potentials to the limiting transistors 51, 52, so that the transient voltage-current characteristic of the voltage limiting circuit 50 is symmetric for positive and negative voltage swings. FIG. 6 shows the symmetric voltage-current characteristic of the voltage limiting circuit 50 of FIG. 5. A plot of the RF input voltage 41 with respect to time is shown compared to the current through the voltage limiting circuit 50. Currents for bias voltages $V_{bN}$ and $V_{bP}$ having a magnitude of 0 V, 0.6 V and 1 V are shown in waveforms 42, 43 and 44 respectively. The waveforms 42, 43 and 44 are balanced, with the current during the negative part of the cycle balancing the current during the positive part of the cycle.

Figure 7:
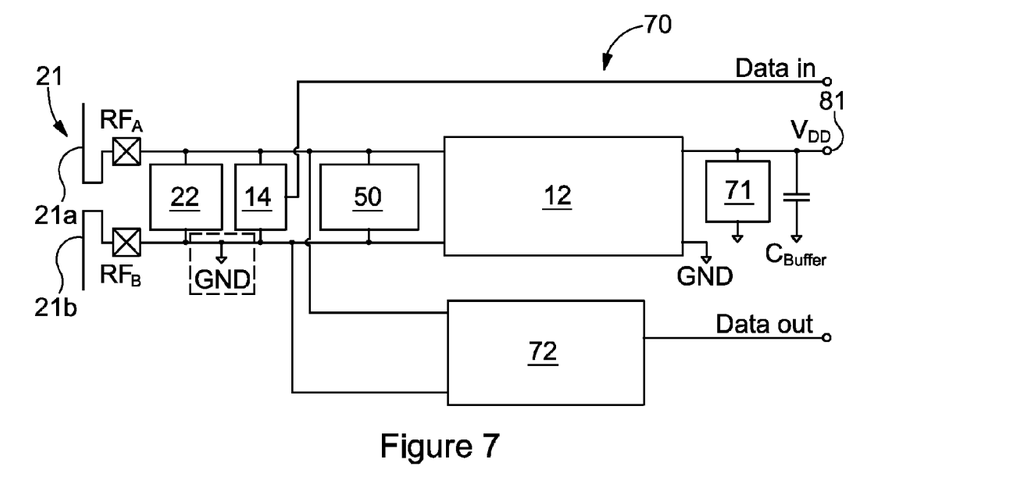
FIG. 7 is a block diagram of a single ended UHF frontend comprising an exemplary voltage limiting circuit.

FIG. 7 is a block diagram of a voltage converter 70 according to an embodiment connected to a UHF antenna 21. A more specific embodiment is shown in FIG. 8, in which example circuit elements are shown.

The UHF antenna 21 comprises a first terminal 21a and a second terminal 21b. The embodiments of FIGS. 7 and 8 comprise single ended front ends, in which the second terminal 21b is grounded, so that the first terminal 21a provides the RF input signal $RF_A$. The voltage converter 70 comprises: ESD protection circuit 22, modulator 14, demodulator 72, RF limiting circuit 50, charge pump 12 and DC limiting circuit 71. A DC output signal VDD is provided at a DC output terminal 81.

Figure 8:
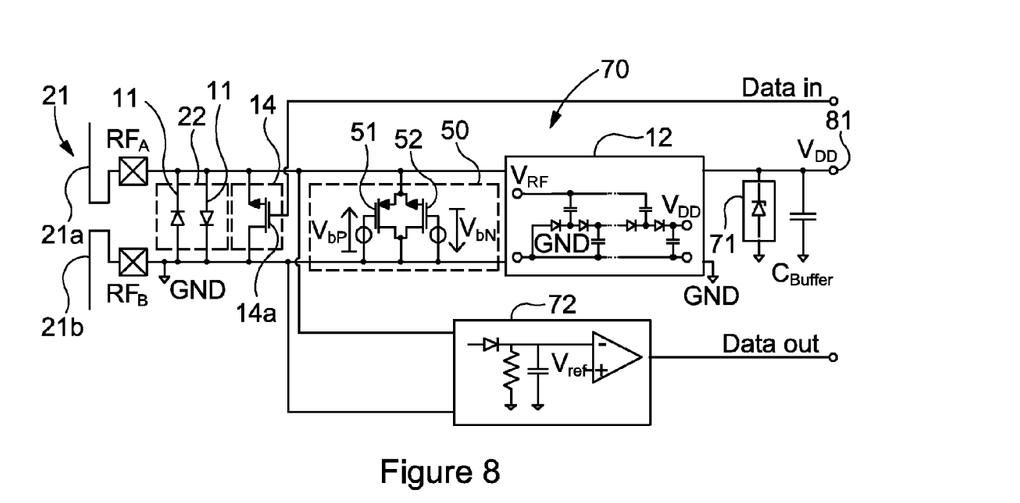
FIG. 8 is a circuit diagram of a single ended UHF frontend comprising an exemplary voltage limiting circuit.

The ESD protection circuit 22 is for protecting the voltage converter 70 from high input voltages, and may comprise anti-parallel diodes (as shown in FIG. 8).

The modulator 14 is for transmitting data via the antenna 21, and may comprise a variable load for modulating the characteristics of the antenna 21. In the embodiment of FIG. 8 the modulator comprises a modulating transistor 14a.

The demodulator 72 receives the RF input signal from the antenna 21 and demodulates it to receive data from the antenna 21. The demodulator 72 may comprise an AM diode detector demodulator with an associated comparator (as shown in FIG. 8).

The charge pump 12 converts the RF input signal $RF_A$ to a DC output voltage $V_{DD}$ which may be used to provide power to at least some of the voltage converter 70, or to other components. The charge pump 12 may comprise a Dickson charge pump (as shown in FIG. 8), and may be a different type of charge pump.

The DC limiting circuit 71 regulates the DC output voltage from the charge pump 12. The DC limiting circuit 71 may comprise a Zener diode (as shown in FIG. 8), or another arrangement, which may comprise active elements, that approximates a Zener diode.

The RF limiting circuit 50 comprises a parallel complimentary PMOS and NMOS transistor 51, 52 and associated negative and positive bias means $V_{bP}$, $V_{bN}$ (as shown in FIG. 8).

The RF limiting circuit provides a balanced transient voltage-current characteristic, which will suppress the generation of even order harmonic components in the frequency domain. This prevents related harmonic components in the backscattered signal of the antenna 21.

Figure 9:
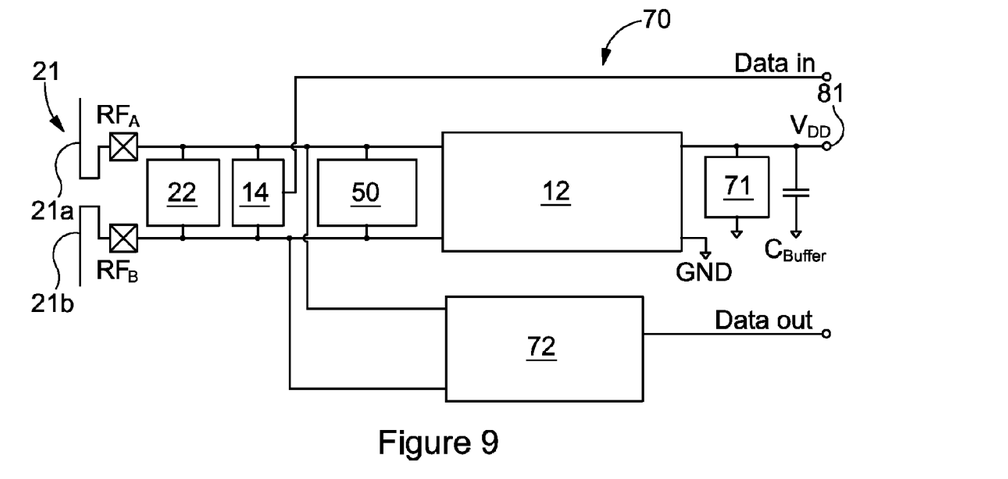
FIG. 9 is a block diagram of a differential UHF frontend comprising an exemplary voltage limiting circuit.
Figure 10:
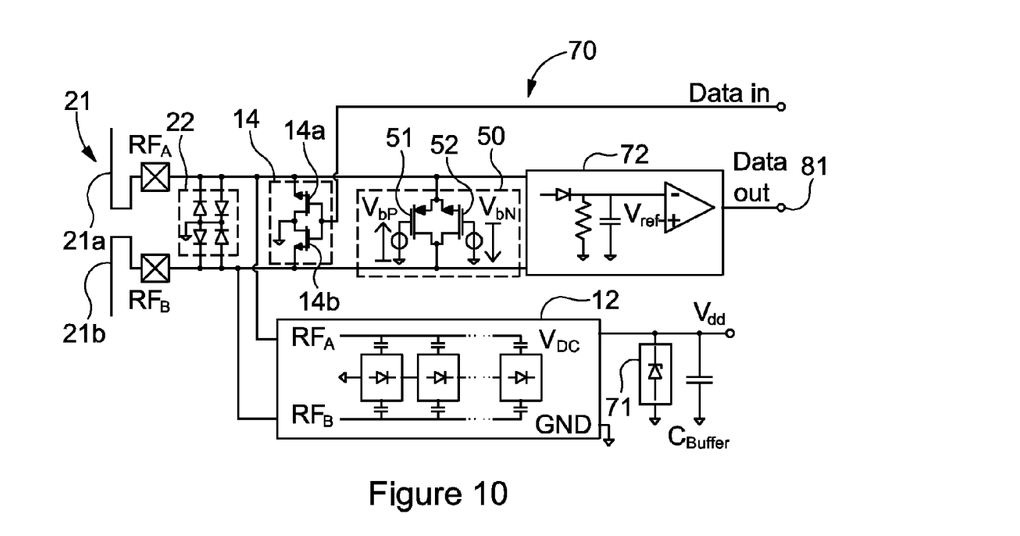
FIG. 10 is a circuit diagram of a differential UHF frontend comprising an exemplary voltage limiting circuit.

FIGS. 9 and 10 show alternative differential embodiments, in which first and second antenna terminals 21a 21b provide differential RF signals $RF_A$ and $RF_B$. The same basic circuit blocks are present, but may be slightly modified to reflect the differential arrangement.

The ESD protection circuit 22 may comprise a pair of anti-parallel diodes for each antenna terminal 21a, 21b, arranged to shunt excess voltage from each RF signal directly to ground.

The modulator 14 may comprise NMOS load transistors 14a, 14b for each antenna terminal 21a, 21b symmetrically connected to ground.

The RF limiting circuit 50 may be connected between the differential RF signal lines carrying $RF_A$ and $RF_B$, so that when the differential RF voltage is too high, current is shunted between the differential RF signal lines. In an alternative embodiment the RF limiting circuit 50 may be arranged to shunt current from each of the differential signal lines to ground. Connecting the RF limiting circuit 50 between the RF nodes allows the dimensions of the device to be minimised while achieving a certain impedance limit required at higher input voltages. Connecting the RF limiting circuit 50 between the RF nodes corresponding with $RF_A$, $RF_B$ is synergistic with the symmetric voltage current characteristics of the RF limiting circuit 50. If the voltage limiting circuit 50 and the modulator 14 were NMOS dominated (as in prior art arrangements), at higher RF voltage amplitudes the common mode potential at the input would rise with respect to chip ground, because the ground connected NMOS structures would act as a charge pump, compromising the shunting efficiency of the voltage limiting circuit 50.

Figure 11:
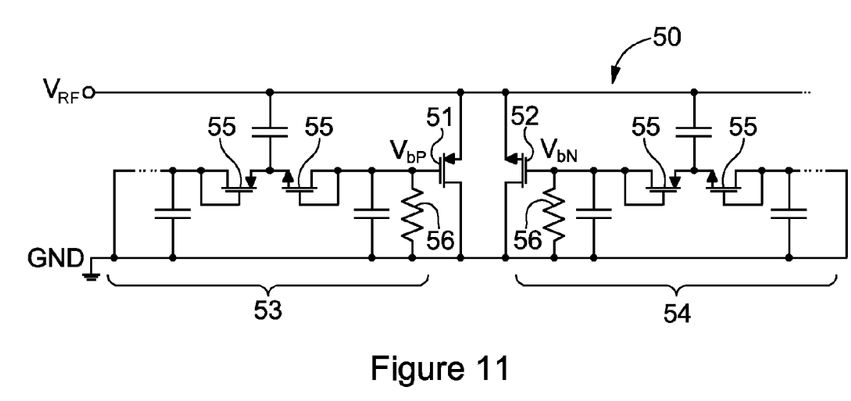
FIG. 11 is a circuit diagram of a voltage limiting circuit including a bias generating circuit comprising a resistive load.

FIG. 11 shows an example of an RF limiting circuit 50 in more detail. The RF limiting circuit 50 comprises a PMOS limiting transistor 51 and an NMOS limiting transistor 52 which are arranged to shunt excess RF input voltage $V_{RF}$ to ground GND. A negative bias generator circuit 53 is provided for generating the bias voltage $V_{bP}$ at the gate of the PMOS limiting transistor 51, and a positive bias generator circuit 54 is provided for generating the bias voltage $V_{bN}$ at the gate of the NMOS limiting transistor 52. Both the positive and negative bias generator circuits 53, 54 employ Dickson charge pumps to produce the bias potentials $V_{bP}$, $V_{bN}$ from the RF input signal $V_{RF}$ by driving current through a resistive load 56 connected to the limiting transistor gate. In other embodiments alternative charge pump arrangements may be used. The Dickson charge pumps comprise transistors 55 wired as diodes, coupled to the RF signal and ground via capacitors. Such MOS diodes do not allow significant charge transfer until the input voltage amplitude exceeds the threshold voltage of the transistor. Subsequent to this, the DC output rises linearly with increasing input amplitude. In contrast, separate stages of the main charge pump 12 conventionally include additional circuitry to compensate for this dead-zone effect by pre-biasing the gates of the MOS transistors of the charge pump, so as to enable minimum operating thresholds of below 300 mV. In most cases the threshold at which the charge pump is operable is significantly below the threshold voltage of the transistors thereof. The MOS transistors of the charge pump may have threshold values in the range of 300 mV to 500 mV. Specifically designed MOS transistors with raised threshold voltage may be used in the RF limiting circuit to tailor the response of the circuit.

Until the input amplitude exceeds the turn-on or threshold voltage of the used the diodes or MOS-devices of the charge pumps 53, 54, the RF limiting circuit 50 is not operable. As a certain level of input power and therewith voltage amplitude is exceeded the bias potentials $V_{bP}$ and $V_{bN}$ rise in magnitude and therefore progressively reduce the equivalent parallel input impedance of the RF limiting circuit 50 circuit with respect to the RF node $RF_A$.

The RF limiting circuit 50 may be operated in concert with a voltage limiter 71 on the DC bus, which may accurately regulate the internal DC voltage supply. Therefore only a rough control mechanism may be necessary for the RF voltage limiter 50. A specific value of load impedance at the output of the auxiliary charge-pumps might suffice.

At minimum RF signal amplitude the charge-pumps 53, 54 are inactive and the bias potentials $V_{bP}$, $V_{bN}$ are essentially zero. The gate-source voltage swing observed at the limiting transistors 51, 52 remains below their threshold and the RF limiting circuit 50 shows high impedance therefore allowing maximum power conversion efficiency of the overall PCU. At increasing RF signal amplitude the charge-pumps 53, 54 become active and the bias potentials $V_{bP}$, $V_{bN}$ rise in magnitude. Effectively the gate-source voltages of the limiting transistors 51, 52 rise in response to the increasing voltage swing and the additionally provided bias. The input impedance of the RF limiter 50 may drop by several decades in absolute value keeping the input amplitude below the operating voltage limits of involved transistors at maximum input power.

Some design parameters of the RF limiting circuit which may be varied include the dimensions of the limiting transistors 51, 52; the number of stages in each of the charge-pumps 53, 54, and the value of load impedance 56. These parameters mainly determine the sensitivity of the biasing of the limiting transistors 51, 52 with respect to the RF input amplitude. The transient behaviour depends on the RC constant found at the gates of the limiting transistors 51, 52.

Figure 12:
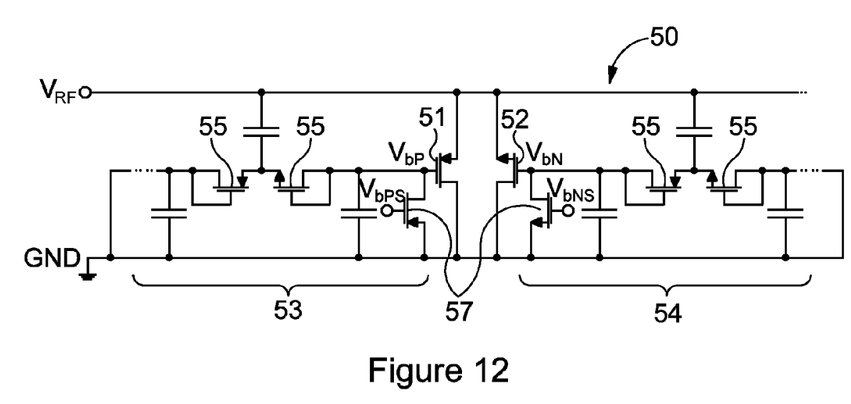
FIG. 12 is circuit diagram of a voltage limiting circuit including a bias generating circuit comprising an active load.

FIG. 12 shows an alternative embodiment in which a non-linear load impedance is employed, which may achieve an enhancement of the impedance characteristic over input amplitude. In this embodiment the load resistors 56 are replaced with transistors 57. The additional transistors 57 resemble, in principle, current sources. For low input current the load transistors 57 show low impedance with respect to ground. As the output current of the charge-pumps 53, 54 rises the impedance of the transistors 57 increases progressively and saturates at the level associated with the transistors 57 in current source operation. Of course, the load transistors 57 would have to be provided with a positive bias potential $V_{bPS}$ and negative bias potential $V_{bNS}$ respectively. Providing the negative bias potential $V_{bPS}$ in particular may require additional effort.

State of the art voltage limiters with shunt devices at the RF terminal, as noted, use predominantly N-type transistors as an active load. Providing positive bias control for such N-type devices is perfectly compatible with the single-ended supply that is generated by the main charge-pump 12. Positive bias control signals for use in the voltage limiting circuit may be derived either from power-detectors that may be part of the demodulator 72 or by using simple rectifying diodes.

However, such principles cannot be adopted to provide the necessary negative voltage bias control for the P-type device(s) of the RF limiting circuit 50. Either a symmetrical supply would be required, which is on larger scale only possible with strong limitations in standard CMOS processes, or, in the case the control voltages generation is integrated in other functional blocks, the synergies are inevitably compromised.

With respect to differential frontends, the limiting transistors 51, 52 can be placed directly between the two RF nodes $RF_A$, $RF_B$ or symmetrically between each RF node and ground. This is true not only for the RF limiting transistors 51, 52, but also for the transistors of the modulator 14, utilized for backscatter communication.

Inserting limiting transistors 51, 52 serially between the RF nodes and centred towards chip ground might be preferred in some embodiments in order to allow integration of the structures into the overall ESD concept. As in case of single-ended frontends, in state of the art solutions mainly N-type devices are used. Considering only the individual RF nodes with reference to ground, such an NMOS dominated structure does not behave symmetrically. This imbalance has the inevitable effect that at higher voltage amplitudes the common mode potential at the input rises with respect to chip ground. The ground connected NMOS structures behave as a parasitic charge-pump.

Figure 13:
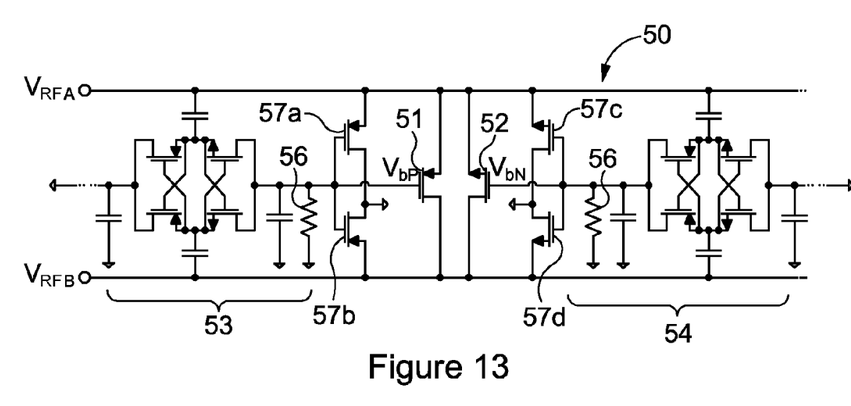
FIG. 13 is a circuit diagram of a voltage limiting circuit including an alternative bias generating circuit.

Connecting the limiting transistors 51, 52 directly between the RF nodes $RF_A$, $RF_B$ on the other hand may reduce the dimensions of the RF limiting circuit for achieving a certain impedance limit required at higher input voltages. Note that it may be particularly desirable under these circumstances for the voltage swing with respect to chip ground to be symmetric. The effect of rising common mode, as described above, may compromise the shunting efficiency of the RF limiting circuit. To counteract this effect a balancing complementary active-load structure can be included, as depicted in FIG. 13 comprising transistors 57. The embodiment of FIG. 13 corresponds to a differential version of the embodiment of FIG. 12 described above.

The embodiment of FIG. 13 comprises a differential charge-pump 53 for generating the negative bias voltage $V_{bP}$ and a differential charge-pump 54 for generating the positive bias voltage $V_{bN}$. A single stage charge-pump 53 is shown, comprising an NMOS and PMOS transistor. The central node of one branch of the charge pump stage is coupled to the first RF signal $V_{RFA}$ via a coupling capacitor, and the central node of the other branch of the charge pump is connected to $V_{RFB}$ via a further coupling capacitor. At each end, both branches of the charge pump stage are connected together and are connected to ground via a coupling capacitor. The gates of the transistors of each branch of each stage are connected to the central node of the other branch in a crossover arrangement.

A resistive load 56 is provided connected to the gate of each of the limiting transistors 51, 52. The complementary active-load structure at the PMOS limiting transistor 51 comprises a pair of PMOS transistors 57a, 57b. A first PMOS transistor 57a has a source connected to the first RF signal $V_{RFA}$, a gate connected to the gate of the PMOS limiting transistor 51, and a drain connected to ground. A second PMOS transistor 57b has a drain connected to the first PMOS transistor drain, a gate connected to the first PMOS transistor gate and a source connected to the second RF signal $V_{RFB}$. The complementary load active-load structure at the NMOS limiting transistor 52 comprises a corresponding arrangement of NMOS transistors.

Other embodiments are intentionally within the scope of the invention as defined by the appended claims.

The invention claimed is:

1. A voltage converter, comprising:
an AC-DC converter connected to an RF input terminal and a DC output terminal and operable to convert an RF signal at the RF input terminal to a DC output signal at the DC output terminal; and
a voltage limiting circuit connected to the RF input terminal and operable to limit the amplitude of the RF signal;
wherein the voltage limiting circuit comprises a NMOS limiting transistor in parallel with a complimentary PMOS limiting transistor.

2. The voltage converter of claim 1, wherein the voltage limiting circuit further comprises a biasing means operable to generate a positive and negative bias voltage for controlling the operation of the NMOS and PMOS limiting transistors respectively.

3. The voltage converter of claim 2, wherein the biasing means is configured to provide symmetric bias potentials to the NMOS and PMOS limiting transistors.

4. The voltage converter of claim 3, wherein the biasing means comprises a charge pump.

5. The voltage converter of claim 4, wherein the biasing means comprises a charge pump arranged to generate a negative bias potential from the RF signal.

6. The voltage converter of claim 5, wherein the biasing means comprises a first charge pump and a second charge pump, wherein the first charge pump is arranged to generate a negative bias signal from the RF signal, and the second charge pump is arranged to generate a positive bias signal from the RF signal.

7. The voltage converter of claim 4, wherein at least one charge pump of the biasing means is configured with a minimum input voltage amplitude below which the charge pump is inoperable.

8. The voltage converter of claim 7, wherein the minimum input voltage amplitude is greater than 0.3 V.

9. The voltage converter of claim 2, wherein the biasing means comprises a resistive load connected to a gate of each limiting transistor.

10. The voltage converter of claim 2, wherein the biasing means comprises a transistor connected to the gate of each limiting transistor.

11. The voltage converter of claim 1, wherein the voltage limiting circuit is connected between the RF input terminal and ground.

12. The voltage converter of claim 1, wherein the AC-DC converter is configured for connection to a differential RF input comprising a first and second RF input terminal, such that the voltage limiting circuit is arranged between the first and second RF terminals.

13. The voltage converter of claim 1, wherein the voltage limiting circuit has a substantially symmetric response to positive and negative over voltage of the RF signal.

14. The voltage converter of claim 1, wherein the voltage converter is for providing a DC voltage to a UHF transponder.

15. A radio frequency transponder comprising: an antenna, the voltage converter of claim 1, a demodulator for receiving data from the antenna and a modulator for transmitting data via the antenna, wherein the voltage limiting circuit is arranged to regulate the amplitude of an RF signal from the antenna.

* * * * *